(12) United States Patent
Pierce et al.

(10) Patent No.: US 10,658,651 B2
(45) Date of Patent: May 19, 2020

(54) SELF STANDING ELECTRODES AND METHODS FOR MAKING THEREOF

(71) Applicant: HONDA MOTOR CO., LTD., Minato-ku, Tokyo (JP)

(72) Inventors: Neal Pierce, Beavercreek, OH (US); Avetik Harutyunyan, Columbus, OH (US)

(73) Assignee: HONDA MOTOR CO., LTD., Tokyo (JP)

(*) Notice: Subject to any disclaimer, the term of this patent is extended or adjusted under 35 U.S.C. 154(b) by 162 days.

(21) Appl. No.: 15/665,171

(22) Filed: Jul. 31, 2017

(65) Prior Publication Data
US 2019/0036103 A1    Jan. 31, 2019

(51) Int. Cl.
| | |
|---|---|
| *H01M 4/04* | (2006.01) |
| *H01M 10/0525* | (2010.01) |
| *H01M 4/505* | (2010.01) |
| *H01M 4/525* | (2010.01) |
| *H01M 4/62* | (2006.01) |

(Continued)

(52) U.S. Cl.
CPC ......... *H01M 4/0419* (2013.01); *B01J 19/00* (2013.01); *H01M 4/0402* (2013.01); *H01M 4/043* (2013.01); *H01M 4/13* (2013.01); *H01M 4/139* (2013.01); *H01M 4/364* (2013.01); *H01M 4/505* (2013.01); *H01M 4/525* (2013.01); *H01M 4/625* (2013.01); *H01M 10/0525* (2013.01); *H01M 4/48* (2013.01); *H01M 4/583* (2013.01); *H01M 4/5825* (2013.01); *H01M 2004/021* (2013.01)

(58) Field of Classification Search
CPC .. H01M 4/0419; H01M 4/0402; H01M 4/043; H01M 4/13; H01M 4/139; H01M 4/364; H01M 4/505; H01M 4/525; H01M 4/625; H01M 4/48; H01M 4/5825; H01M 4/582; H01M 10/0525; H01M 2004/021
See application file for complete search history.

(56) References Cited

U.S. PATENT DOCUMENTS

| | | | |
|---|---|---|---|
| 3,772,084 A | 11/1973 | Scholle | |
| 5,985,175 A * | 11/1999 | Fan ...................... | C09K 11/025 252/301.4 H |

(Continued)

FOREIGN PATENT DOCUMENTS

| | | |
|---|---|---|
| CN | 102593436 A | 7/2012 |
| CN | 102674316 A | 9/2012 |

(Continued)

OTHER PUBLICATIONS

A. Weidenkaff et al. "Metal Nanoparticles for the Production of Carbon Nanotube Composite Materials by Decomposition of Different Carbon Sources" Materials Science and Engineering C, vol. 19, pp. 119-123, 2002.

(Continued)

*Primary Examiner* — Gregg Cantelmo
(74) *Attorney, Agent, or Firm* — Arent Fox LLP (57) ABSTRACT

The present disclosure relates to a method of making a composite product that may be used as a flexible electrode. An aerosolized mixture of nanotubes and an electrode active material is collected on a porous substrate, such as a filter, until it reaches a desired thickness. The resulting self-standing electrode may then be removed from the porous substrate and may operate as a battery electrode.

31 Claims, 7 Drawing Sheets

(51) Int. Cl.
| | |
|---|---|
| *H01M 4/36* | (2006.01) |
| *H01M 4/139* | (2010.01) |
| *H01M 4/13* | (2010.01) |
| *B01J 19/00* | (2006.01) |
| *H01M 4/02* | (2006.01) |
| *H01M 4/583* | (2010.01) |
| *H01M 4/58* | (2010.01) |
| *H01M 4/48* | (2010.01) |

(56) References Cited

U.S. PATENT DOCUMENTS

| | | | |
|---|---|---|---|
| 8,435,676 B2 | 5/2013 | Zhamu et al. | |
| 8,974,960 B2 | 3/2015 | Manthiram et al. | |
| 9,406,985 B2 | 8/2016 | Amaratunga et al. | |
| 9,502,734 B1 | 11/2016 | Lim et al. | |
| 9,711,763 B2 | 7/2017 | Sohn et al. | |
| 9,786,872 B2 | 10/2017 | Suh et al. | |
| 9,812,681 B2 | 11/2017 | Heo | |
| 9,859,586 B2 | 1/2018 | Suh et al. | |
| 9,887,644 B2 | 2/2018 | Kim et al. | |
| 9,941,492 B2 | 4/2018 | Suh et al. | |
| 9,979,225 B2 | 5/2018 | Bernhard | |
| 10,033,031 B2 | 7/2018 | Wang et al. | |
| 10,090,556 B2 | 10/2018 | Rho et al. | |
| 10,147,915 B2 | 12/2018 | Song et al. | |
| 10,217,971 B2 | 2/2019 | Takahashi et al. | |
| 2003/0099883 A1* | 5/2003 | Ochoa | B82Y 30/00 429/232 |
| 2004/0234445 A1 | 11/2004 | Serp et al. | |
| 2005/0063891 A1 | 3/2005 | Shaffer et al. | |
| 2005/0221185 A1* | 10/2005 | Sakata | H01M 4/133 429/231.8 |
| 2006/0039849 A1 | 2/2006 | Resasco et al. | |
| 2006/0116443 A1 | 6/2006 | Probst et al. | |
| 2006/0151318 A1* | 7/2006 | Park | H01M 4/0404 204/284 |
| 2006/0245996 A1 | 11/2006 | Xie et al. | |
| 2007/0274899 A1 | 11/2007 | Wolf et al. | |
| 2008/0131351 A1 | 6/2008 | Wang et al. | |
| 2008/0233402 A1 | 9/2008 | Carlson et al. | |
| 2009/0117026 A1 | 5/2009 | Shimazu et al. | |
| 2009/0142659 A1 | 6/2009 | Lai et al. | |
| 2009/0208708 A1 | 8/2009 | Wei et al. | |
| 2009/0274609 A1 | 11/2009 | Harutyunyan et al. | |
| 2009/0286675 A1 | 11/2009 | Wei et al. | |
| 2010/0140560 A1* | 6/2010 | Wang | B82Y 30/00 252/509 |
| 2010/0276644 A1 | 11/2010 | Wolf et al. | |
| 2011/0060162 A1 | 3/2011 | Tatsuhara et al. | |
| 2011/0111279 A1* | 5/2011 | Smithyman | B29C 41/16 429/122 |
| 2011/0123429 A1 | 5/2011 | Bordere et al. | |
| 2011/0150746 A1 | 6/2011 | Khodadadi et al. | |
| 2011/0158892 A1 | 6/2011 | Yamaki | |
| 2011/0177393 A1 | 7/2011 | Park et al. | |
| 2011/0311874 A1 | 12/2011 | Zhou et al. | |
| 2012/0107683 A1* | 5/2012 | Kim | H01M 4/0404 429/211 |
| 2012/0132861 A1 | 5/2012 | Tamamitsu et al. | |
| 2012/0149824 A1 | 6/2012 | Hocke et al. | |
| 2012/0241666 A1* | 9/2012 | Hong | H01M 4/136 252/182.1 |
| 2012/0282522 A1* | 11/2012 | Axelbaum | B82Y 30/00 429/219 |
| 2012/0315539 A1 | 12/2012 | Lashmore et al. | |
| 2013/0040229 A1 | 2/2013 | Grigorian et al. | |
| 2013/0065130 A1 | 3/2013 | Ban et al. | |
| 2013/0106026 A1* | 5/2013 | Wang | H01M 4/13 264/442 |
| 2013/0149440 A1* | 6/2013 | Pyzik | B01J 35/04 427/140 |
| 2013/0189565 A1 | 7/2013 | Lashmore et al. | |
| 2013/0224551 A1 | 8/2013 | Hiralal et al. | |
| 2014/0013588 A1 | 1/2014 | Wang et al. | |
| 2014/0141248 A1 | 5/2014 | Noyes | |
| 2014/0326181 A1* | 11/2014 | Kim | C23C 14/246 118/715 |
| 2014/0370347 A1 | 12/2014 | Jung et al. | |
| 2015/0200417 A1 | 7/2015 | Song et al. | |
| 2015/0207143 A1 | 7/2015 | Wu et al. | |
| 2015/0243452 A1 | 8/2015 | Gruner et al. | |
| 2015/0325820 A1 | 11/2015 | Sohn et al. | |
| 2015/0333302 A1 | 11/2015 | Johns et al. | |
| 2015/0340684 A1 | 11/2015 | Voillequin et al. | |
| 2015/0340741 A1 | 11/2015 | Kim et al. | |
| 2015/0364750 A1 | 12/2015 | Maheshwari et al. | |
| 2016/0013457 A1 | 1/2016 | Suh et al. | |
| 2016/0013458 A1 | 1/2016 | Suh et al. | |
| 2016/0020437 A1 | 1/2016 | Sohn et al. | |
| 2016/0023905 A1 | 1/2016 | Wei | |
| 2016/0036059 A1 | 2/2016 | Tokune et al. | |
| 2016/0040780 A1 | 2/2016 | Donahue | |
| 2016/0049569 A1 | 2/2016 | Negrin | |
| 2016/0079629 A1* | 3/2016 | Abe | H01M 10/052 429/331 |
| 2016/0082404 A1* | 3/2016 | Pigos | B01J 13/0095 252/75 |
| 2016/0126554 A1 | 5/2016 | Beneventi et al. | |
| 2016/0149253 A1 | 5/2016 | Yi et al. | |
| 2016/0329533 A1 | 11/2016 | Tajima | |
| 2016/0365544 A1 | 12/2016 | Lee et al. | |
| 2016/0372717 A1 | 12/2016 | Noda | |
| 2017/0005504 A1 | 1/2017 | Rho et al. | |
| 2017/0018799 A1 | 1/2017 | Jeong | |
| 2017/0033326 A1 | 2/2017 | Goto et al. | |
| 2017/0040582 A1 | 2/2017 | Kim | |
| 2017/0155098 A1 | 6/2017 | Park et al. | |
| 2017/0155099 A1 | 6/2017 | Song et al. | |
| 2017/0214052 A1 | 7/2017 | Xu | |
| 2017/0263972 A1 | 9/2017 | Rho et al. | |
| 2017/0288255 A1 | 10/2017 | Kim et al. | |
| 2017/0338439 A1 | 11/2017 | Yokoyama | |
| 2017/0338449 A1 | 11/2017 | Rho et al. | |
| 2018/0026236 A1 | 1/2018 | Lee et al. | |
| 2018/0241081 A1 | 8/2018 | Deng et al. | |
| 2018/0309117 A1 | 10/2018 | Zhu et al. | |
| 2019/0088925 A1 | 3/2019 | Harutyunyan et al. | |
| 2019/0140270 A1 | 5/2019 | Wang et al. | |

FOREIGN PATENT DOCUMENTS

| | | |
|---|---|---|
| CN | 103715394 B | 1/2016 |
| CN | 104392845 B | 3/2017 |
| CN | 104362326 B | 8/2017 |
| CN | 108878717 A | 11/2018 |
| EP | 2 476 648 A1 | 7/2012 |
| EP | 2835177 A1 | 2/2015 |
| JP | 2005-272277 A | 10/2005 |
| JP | 2017-130274 A | 7/2017 |
| KR | 10-1548465 B1 | 8/2015 |
| KR | 10-2016-0129440 A | 11/2016 |
| KR | 10-1676641 B1 | 11/2016 |
| KR | 10-1703516 B1 | 2/2017 |
| KR | 10-1729702 B1 | 4/2017 |
| KR | 10-2019-0040554 A | 4/2019 |
| WO | WO 2014/102131 A2 | 7/2014 |
| WO | WO 2018/194415 A1 | 10/2018 |

OTHER PUBLICATIONS

Chee Howe See et al., "CaCO3 Suppoerted Co—Fe Catalysts for Carbon Nanotube Synthesis in Fluidized Bed Reactors" Particle Technology and Fluidization, vol. 54, No. 3, pp. 657-664, Mar. 2008.

Danafar et. al., "Fluidized bed catalytic chemical vapor deposition synthesis of carbon nanotubes-A review," The Chemical Engineering Journal, vol. 155, pp. 37-48, 2009.

Dunens, O., et. al., "Synthesis of Multiwalled Carbon Nanotubes on Fly Ash Derived Catalysts," Environ. Sci. Technol., vol. 43, pp. 7889-7894, 2009.

(56) References Cited

OTHER PUBLICATIONS

Hasegawa Kei et. al., "Lithium Ion Batteries Made of Electrodes with 99 wt% active materials and 1wt% carbon nanotubes without binder or metal foils", Journal of Power Sources, vol. 321, pp. 155-162, 2016.

Hu, Liangbing et al., Thin, Flexible Secondary Li-Ion Paper Batteries, ACS Nano, vol. 4, No. 10, pp. 5843-5848, 2010.

Luo Shu et al., "Binder-Free LiCoO2/Carbon Nanotube Cathodes for High-Performance Lithium Ion Batteries" Advanced Materials, vol. 24, pp. 2294-2298, 2012.

Sarah Maghsoodi et al., "A Novel Continuous Process for Synthesis of Carbon Nanotubes Using Iron Floating Catalyst and MgO Particles for CVD of methane in a fluidized bed reactor" Applied Surface Science, vol. 256, pp. 2269-2274, 2010.

Wang Ke et al., "Super-Aligned Carbon Nanotube Films as Current Collectors for Lightweight and Flexible Lithium Ion Batteries" Advanced Functional Materials, vol. 23, pp. 846-853, 2013.

Zhao, M.Q. et. al., "Towards high purity graphene/single-walled carbon nanotube hybrids with improved electrochemical capacitive performance," Carbon, vol. 54, pp. 403-411, 2013.

Extended European Search Report issued in corresponding European Application No. 18184002.6 dated Nov. 30, 2018.

Extended European Search Report issued in corresponding European Patent Application No. 18194469.5 dated Dec. 4, 2018.

The Extended European Search Report issued in corresponding European Patent Application No. 18186402.6 dated Oct. 11, 2018.

Xian-Ming Liu et al., "Carbon nanotube (CNT)-based composites as electrode material for rechargeable Li-ion batteries: A review", Composite Science and Technology, vol. 72, pp. 121-144, (2012).

Jenax Inc., Flexible Lithium Polymer Battery J . FLEX, Copyright 2014, (6 Pages Total).

Nanalyze., A Flexible Battery from Blue Spark Technologies, Apr. 8, 2014, (4 Pages Total).

Panasonic Corp., Panasonic Develops Bendable, Twistable, Flexible Lithium-ion Battery, Sep. 29, 2016, (8 Pages Total).

ProLogium Technology Co., Ltd., FLCB Flexible Type LCB, Copyright 2015, (6 Pages Total).

Sebastian Anthony., LG produces the first flexible cable-type lithium-ion battery, ExtremeTech, Aug. 30, 2012, (9 Pages Total).

The Swatch Group Ltd., A revolutionary battery by Belenos: The Watchmaker Swatch Group Has Signed An Agreement With The Chinese Geely Group For Use Of Its Innovative New Battery., as accessed on May 29, 2019, (3 Pages Total), https://www.swatchgroup.com/en/ swatch-group/innovation-powerhouse/industry-40/revolutionary-battery-belenos.

Vishwam Sankaran., Samsung is reportedly developing a curved battery for its foldable phone, Jul. 4, 2018, (4 Pages Total).

Communication dated Jul. 31, 2019, from the European Patent Office in counterpart European Application No. 18194454.7.

International Search Report and Written Opinion, issued by International Searching Authority in corresponding International Application No. PCT/US19/49923, dated Jan. 23, 2020.

Joo-Seong Kim et al., Supporting Information, A Half Millimeter Thick Coplanar Flexible Battery with Wireless Recharging Capability, Nano Letters 2015 15 (4), 9 Pages Total, (2015).

Xiong Pu et al., "A Self-Charging Power Unit by Integration of a Textile Triboelectric Nanogenerator and a Flexible Lithium-Ion Battery for Wearable Electronics", Advanced Materials 27, pp. 2472-2478, (2015).

Communication issued by the International Searching Authority in corresponding International Application No. PCT/US19/49923, dated Nov. 13, 2019 (PCT/ISA/206).

Kun Kelvin Fu et al., "Flexible Batteries: From Mechanics to Devices", 2016 American Chemical Society, ACS Publications, ACS Energy Letters 1, pp. 1065-1079 (2016).

Sau Yen Chew et al., "Flexible free-standing carbon nanotube films for model lithium-ion batteries", Carbon 47, pp. 2976-2983, (2009).

Sheng Xu et al., "Stretchable batteries with self-similar serpentine interconnects and integrated wireless recharging systems " Nature communications 4:1543, DOI: 10.1038/ncomms2553, 8 Pages Total, (2013).

Shu Luo et al. "Binder-Free LiCoO2/Carbon Nanotube Cathodes for High-Performance Lithium Ion Batteries", Advanced Materials 24, pp. 2294-2298, (2012).

Zhiqian Wang et al., "Fabrication of High-Performance Flexible Alkaline Batteries by Implementing Multiwalled Carbon Nanotubes and Copolymer Separator" Advanced Materials 26, pp. 970-976, (2014).

Zhiqiang Niu et al., "A skeleton/skin" strategy for preparing ultrathin free-standing single-walled carbon nanotube/polyaniline films for high performance supercapacitor electrodes', The Royal Society of Chemistry 2012, Energy & Environmental Science 5, pp. 8726-8733, (2012).

* cited by examiner

FIG. 8
After pressing (7ton)

FIG. 7
As prepared self standing material
(LiNMC+0.8wt% CNT)

FIG. 10
Top view
Active material: LiMMC
CNT web
1 μm

FIG. 9
Side view
100 μm

SELF STANDING ELECTRODES AND METHODS FOR MAKING THEREOF

JOINT RESEARCH AGREEMENT

The presently claimed invention was made by or on behalf of the below listed parties to a joint research agreement. The joint research agreement was in effect on or before the date the claimed invention was made, and the claimed invention was made as a result of activities undertaken within the scope of the joint research agreement. The parties to the joint research agreement are 1) Honda Research Institute USA, Inc.; and 2) NanoSynthesis Plus, Ltd.

BACKGROUND

Single walled carbon nanotubes (SWNTs) as additives in various matrices has become one of the most intensively studied areas for applications, owing to their excellent electrical and mechanical properties and high aspect ratio, which is crucial for composite materials. Among various applications, the exploitation of SWNTs as an additive material for performance enhancement of battery electrodes is very promising. The core of mixing technologies is based on liquid process and includes five required steps: a) synthesis of nanotubes, b) dispersion of nanotubes in the proper solvent (de-aggregation), c) functionalization of the nanotube surfaces (protecting against aggregation), d) mixing with binder and e) mixing with active material (preparing slurry). These processes not only are expensive, but also degrade nanotube properties, e.g. dispersion by ball milling, sonication etc., which leads to inevitable reduction of aspect ratio and the introduction of defects and as a result, requires more nanotube loading (wt %) for improved performance.

SUMMARY

In some embodiments, the present disclosure is directed to a method of producing a self-standing electrode. The method includes providing an aerosolized mixture of nanotubes and an electrode active material powder, and collecting the mixture on a porous substrate to form the self-standing electrode.

In some embodiments, the present disclosure is directed to a method of producing a self-standing electrode. The method comprises providing an aerosolized mixture of nanotubes and an electrode active material powder, providing at least a first porous substrate, directing the aerosolized mixture toward the first porous substrate, and collecting the mixture on the first porous substrate to form the self-standing electrode, wherein the self-standing electrode is free of binder and metal-based current collector.

In some embodiments, the present disclosure is directed to a method of producing a self-standing electrode, the method comprising: aerosolizing an electrode active material to produce an aerosolized electrode active material powder, contacting the aerosolized electrode active material powder with single-walled carbon nanotubes in a carrier gas to form a mixture of the single-walled carbon nanotubes and the aerosolized electrode active material powder; collecting the mixture on a surface; and removing the carrier gas, to form the self-standing electrode material that is a composite of single-walled carbon nanotubes and the electrode active material, wherein the self-standing electrode is free of binder and metal-based current collector.

In some embodiments, the present disclosure is directed to an apparatus for producing a self-standing electrode, comprising: a single-walled carbon nanotube synthesis reactor which produces single-walled carbon nanotubes; an aerosolizing reactor configured to aerosolize an electrode active material into an aerosolized electrode active material powder and connected to the carbon nanotube synthesis reactor such that the aerosolized electrode active material powder is contacted with the single-walled carbon nanotubes in a carrier gas to form a mixture of the single-walled carbon nanotubes and the aerosolized electrode active material powder, and a collection chamber having a surface configured to collect the mixture and remove the carrier gas so as to form the self-standing electrode material that is a composite of the single-walled carbon nanotubes and the electrode active material.

In some embodiments, the present disclosure is directed to a self-standing electrode, comprising a composite of an electrode active material and single-walled carbon nanotubes; wherein the self-standing electrode does not contain binder material or a metal-based current collector material.

DETAILED DESCRIPTION

The present disclosure provides methods and apparatuses for the production of self-standing electrodes. Also provided are self-standing electrodes comprising a mixture of nanotubes and electrode active materials.

In an embodiment, a self-standing electrode is prepared by providing an aerosolized mixture of nanotubes and electrode active materials, and directing the aerosolized mixture to a porous substrate to form a self-standing electrode thereon comprising the mixed carbon nanotubes and the electrode active materials.

In some embodiments, the present disclosure is directed to a method of producing a self-standing electrode, the method comprising: aerosolizing an electrode active material to produce an aerosolized electrode active material powder; contacting the aerosolized electrode active material powder with single-walled carbon nanotubes in a carrier gas to form a mixture of the single-walled carbon nanotubes and the aerosolized electrode active material powder, collecting the mixture on a surface; and removing the carrier gas, to form the self-standing electrode material that is a composite of single-walled carbon nanotubes and the electrode active material.

As used herein, "electrode active material" refers to the conductive material in an electrode. The term "electrode" refers to an electrical conductor where ions and electrons are exchanged with an electrolyte and an outer circuit. "Positive electrode" and "cathode" are used synonymously in the present description and refer to the electrode having the higher electrode potential in an electrochemical cell (i.e. higher than the negative electrode). "Negative electrode" and "anode" are used synonymously in the present description and refer to the electrode having the lower electrode potential in an electrochemical cell (i.e. lower than the positive electrode). Cathodic reduction refers to a gain of electron(s) of a chemical species, and anodic oxidation refers to the loss of electron(s) of a chemical species.

Figure 1:
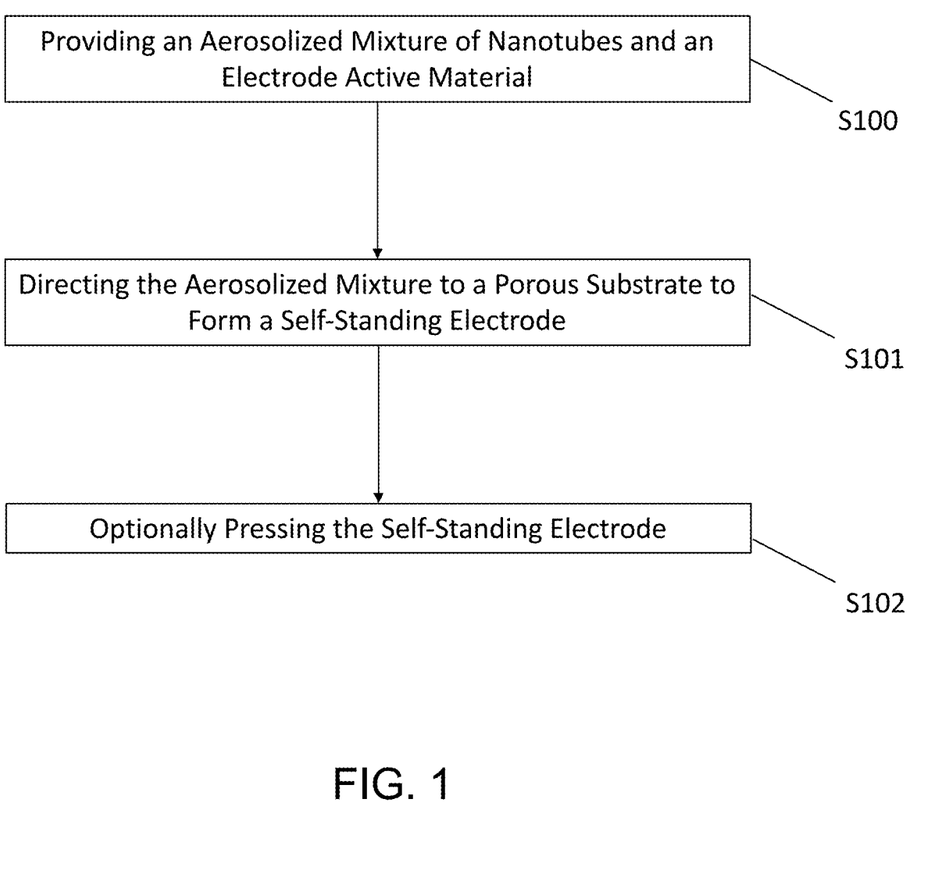
FIG. 1 is a schematic block diagram illustrating an exemplary method of making a self-standing electrode according to an embodiment of the present disclosure.

In a non-limiting example as shown in FIG. 1, self-standing electrodes for Li-ion batteries are prepared by providing an aerosolized mixture of carbon nanotubes and electrode active materials at step S100, and directing the aerosolized mixture to a porous substrate at step S101 to form a composite self-standing electrode of a desired thickness thereon that comprises the mixed carbon nanotubes and the electrode active materials. Optionally, the self-standing electrode can be treated at step S102 to, for example, increase the density of the self-standing electrode. The self-standing electrode is self-supported, flexible, and can optionally be cut to the desired dimensions of a battery electrode. The self-standing electrode is optionally free of binder and optionally can be used without a metal-based current collector (typically alumina or copper depending on the electrode type).

Figure 2:
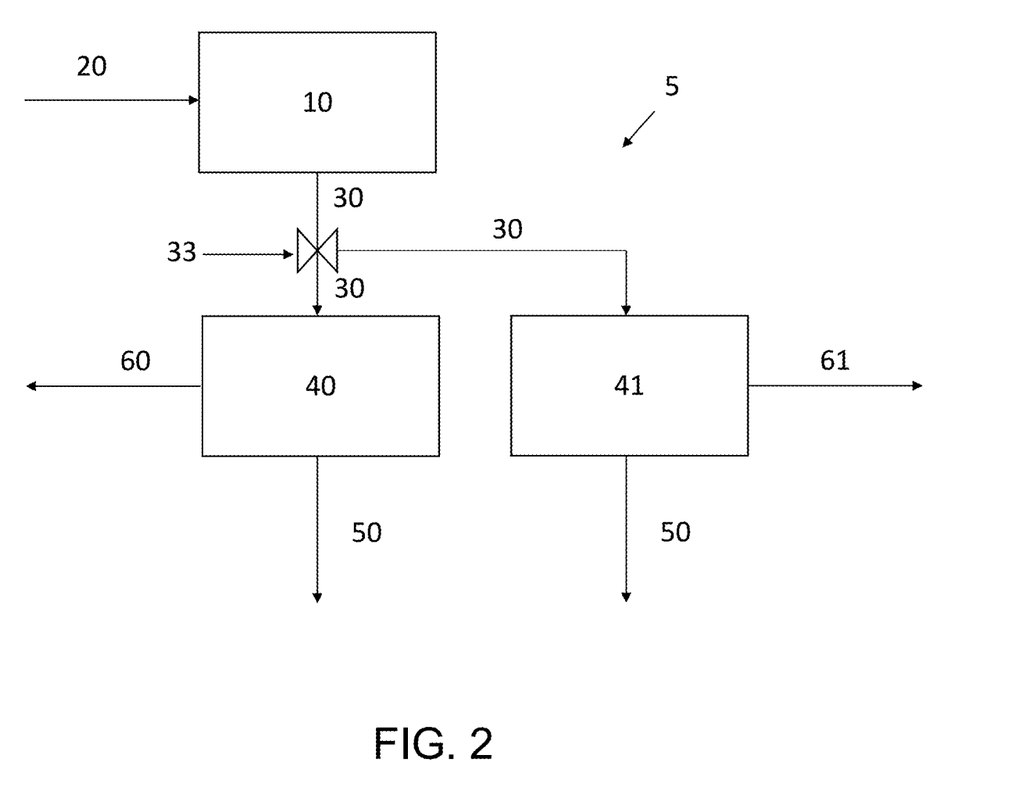
FIG. 2 is a flow diagram illustrating an exemplary apparatus for making a self-standing electrode according to an embodiment of the present disclosure.

The apparatus for providing the aerosolized mixture of carbon nanotubes and electrode active materials is not limited in any way. In an illustrative example as shown in FIG. 2, an apparatus 5 for the production of self-standing electrodes is provided. The carbon nanotubes and the electrode active materials are added to a vessel 10. The carbon nanotubes and the electrode active materials may be individually collected from their respective manufacturing processes and directly or indirectly introduced from such processes into the vessel 10 at a desired ratio for the self-standing electrode. One or more carrier gases 20 may then be introduced to the vessel 10 to aerosolize the mixture of the nanotubes and electrode active materials. The resulting mixed aerosolized stream 30 comprising the nanotubes and the electrode active materials entrained in the carrier gas is directed to a porous substrate 40, such as a filter. The carrier gas passes through the porous substrate 40 as gas stream 50 while the mixture of the nanotubes and the electrode active material is captured on the surface of the porous substrate 40 to form the self-standing electrode 60. The self-standing electrode 60 can be removed from the porous substrate 40 when it reaches the desired thickness.

Optionally, the apparatus 5 may include a plurality of porous substrates 40, 41 to allow for the continuous production of self-standing electrodes 60, 61. Although only two porous substrates are shown, it is to be understood than any number of porous substrates may be included in the apparatus 5. In a non-limiting example, when the flow of the mixed aerosolized stream 30 across the porous substrate 40 produces the self-standing electrode 60 of the desired thickness, a valve 33 may be adjusted to transfer the flow of the mixed aerosolized stream 30 to a second porous substrate 41. The self-standing electrode 60 may be removed from the first porous substrate 40 during formation of the self-standing electrode 61 on the porous substrate 41. When the flow of the mixed aerosolized stream 30 across the second porous substrate 41 produces the self-standing electrode 61 of a desired thickness, the valve 33 may be adjusted to transfer the flow of the mixed aerosolized stream 30 back to the first porous substrate 40. The thickness and/or cross-sectional area of the self-standing electrode 61 may be the same, or different, than the cross-sectional area of the self-standing electrode 60. For example, the self-standing electrode 61 may have a greater thickness and/or cross-sectional area than the self-standing electrode 60.

It is to be understood that a variety of different methods may be used for automatically switching the valve 33 to redirect the flow of the mixed aerosolized stream 30 from one porous substrate to the other. Illustrative examples of systems that may be used to adjust the valve 33 to redirect the flow of the mixed aerosolized stream 30 include one or more sensors for detecting the thickness of the self-standing electrodes 60 and 61, one or more pressure sensors for monitoring a pressure drop across the porous substrates 40 and 41 that corresponds to a desired thickness of the self-standing electrodes 60 and 61, a timer that switches the valve 33 after a set time corresponding to a desired thickness of the self-standing electrodes 60 and 61 for a given flow rate of the mixed aerosolized stream 30, and any combination thereof; after the one or more pressure sensors measures a pressure drop associated with the desired thickness of the self-standing electrode 60 or 61 on porous substrate 40 or 41, or after the one or more thickness sensors detect the desired thickness of the self-standing electrode 60 or 61 on porous substrate 40 or 41, or after the timer measures the set time corresponding to the desired thickness of self-standing electrode 60 or 61 on porous substrate 40 or 41, the mixture is redirected from one porous substrate to the other. It is also to be understood that the porous substrates 40 and/or 41 may have a cross-sectional area that matches the desired cross-sectional area required for use in the battery cell to be made with the self-standing electrode 60 and/or 61. Accordingly, the self-standing electrodes 60 and/or 61 would require no further processing of the cross-sectional area, such as cutting, before assembly in the final battery cell.

Figure 3:
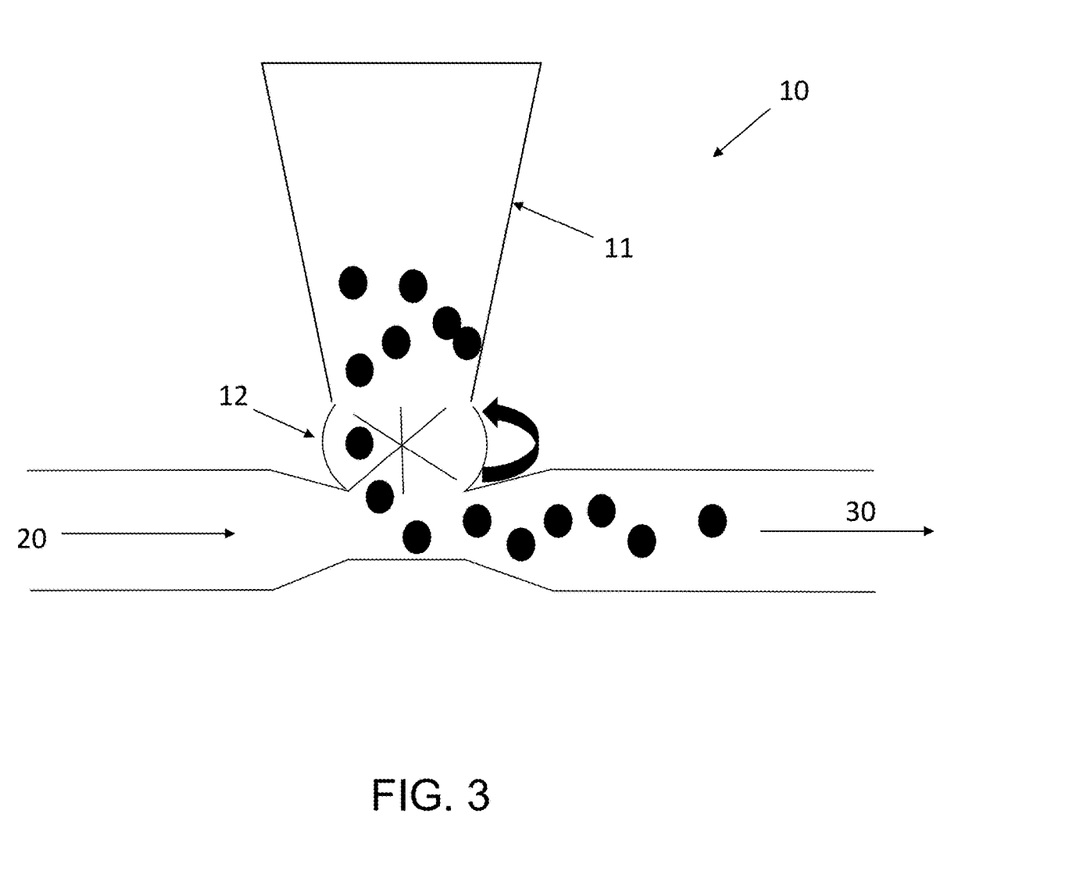
FIG. 3 is a schematic view illustrating a vessel according to an embodiment of the present disclosure.

It is to be understood that the configuration of the vessel 10 is not intended to be limited in any way. In an illustrative example as shown in FIG. 3, the vessel 10 may be a pneumatic powder feeder, such as a venturi feeder that includes a hopper 11 for receiving the nanotubes and the electrode active material therein. The vessel 10 may also include a rotary valve 12 that feeds the nanotubes and the electrode active material into contact with the carrier gas 20 that is introduced to the vessel 10 to form the mixed aerosolized stream 30.

Figure 4:
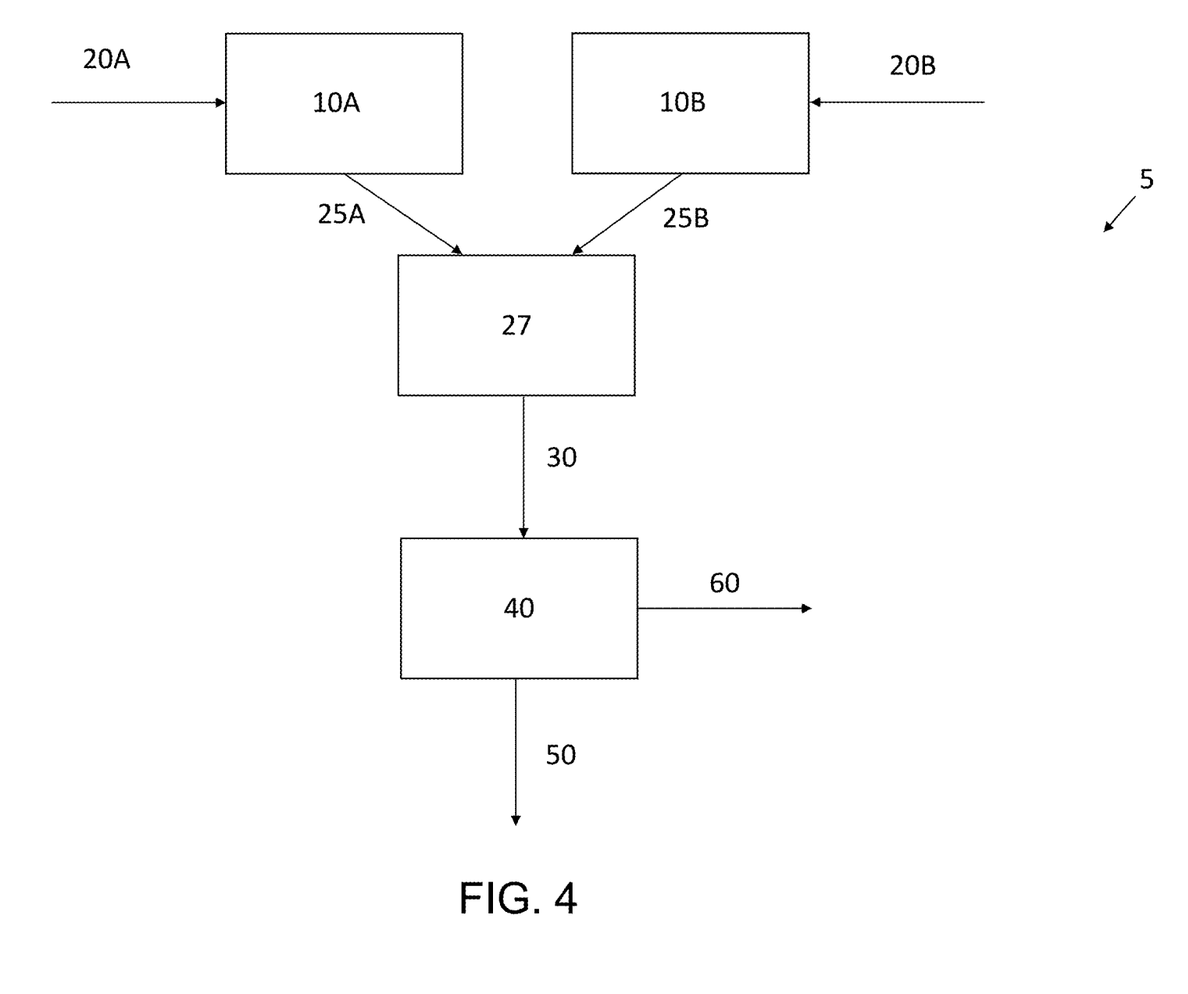
FIG. 4 is a flow diagram illustrating an exemplary apparatus for making a self-standing electrode according to an embodiment of the present disclosure.

As shown in FIG. 4, the nanotubes and the electrode active material may be individually aerosolized before mixing. For example, the nanotubes may be provided in the vessel 10A and the electrode active material may be provided in the vessel 10B. One or more carrier gases 20A may be introduced to the vessel 10A to aerosolize the nanotubes, and one or more carrier gases 20B may be introduced to the vessel 10B to aerosolize the electrode active materials. An aerosolized stream 25A comprises the nanotubes entrained in the carrier gas 20A introduced to the vessel 10A, and an aerosolized stream 25B comprises the electrode active materials entrained in the carrier gas 20B introduced to the vessel 10B. The aerosolized stream 25A is mixed with the aerosolized stream 25B at junction 27. The junction 27 may have any configuration capable of combining the aerosolized stream 25A and the aerosolized stream 25B into the mixed aerosolized stream 30 that comprises a mixture of the nanotubes and the electrode active materials entrained in the carrier gases. The mixed aerosolized stream 30 is directed to the porous substrate 40. The carrier gas passes through the porous substrate 40 as gas stream 50 while the mixture of the nanotubes and the electrode active material is captured on the surface of the porous substrate 40 to form the self-standing electrode 60. The self-standing electrode 60 can be removed from the porous substrate 40 when it reaches the desired thickness. The carrier gases 20A and 20B may be the same, or different, and may be introduced at the same or different flow rates. For example, the flow rates of the carrier gases 20A and 20B may be tailored to feed the nanotubes and the electrode active material to the junction 27 at the individual flow rates necessary to achieve the desired ratio of nanotubes to electrode active material in the resulting self-standing electrode 60. Although not shown, it is to be understood that more than one porous substrate 40 may be provided as described with respect to FIG. 2.

As shown in FIG. 5, the nanotubes may be provided in an aerosolized stream 25A directly from the vessel 10A that is configured as a nanotube synthesis reactor for mixing with an aerosolized stream 25B of the electrode active material from the source 106. Accordingly, the aerosolized stream 25A may be a product stream exiting the nanotube synthesis reactor. For example, a carbon source or carbon precursor 130 may be introduced to the vessel 10A in the presence of one or more carrier gases 20A to form carbon nanotubes. The aerosolized stream 25A of carbon nanotubes exits the reactor outlet 175 and travels down a pipe or tube 412 to a junction 27 where the aerosolized carbon nanotubes are mixed with the aerosolized stream 25B of the electrode active materials. Although the pipes forming the junction 27 intersect at a 90 degree angle of intersection '$\alpha$', other angles of intersection $\alpha$ may be formed. In a non-limiting example, the angle of intersection $\alpha$ may be an acute angle that facilitates flow of the resulting mixed aerosolized stream 30 from the junction 27 to the porous substrate 40. Although not shown, it is to be understood that more than one porous substrate 40 (and collection vessel 170) may be provided as described with respect to FIG. 2.

As an alternative to the specific apparatus noted above where the electrode active material is mixed with the nanotubes after the nanotubes are formed, the electrode active material can be mixed in situ in a fluidized bed reactor or chamber with the nanotubes as the nanotubes are formed.

Carrier and fluidizing gases suitable for use with the present disclosure include, but are not limited to, argon, hydrogen, nitrogen, and combinations thereof. Carrier gases may be used at any suitable pressure and at any suitable flow rate to aerosolize the nanotubes and the electrode active materials and transport the aerosolized mixture of the nanotubes and the electrode active materials to the porous substrate at a sufficient velocity to form the self-standing electrode on the surface thereof. In some embodiments, the carrier gas may be argon, hydrogen, helium, or mixtures thereof. In some embodiments, the carrier gas may comprise argon at a flow rate of 850 standard cubic centimeters per minute (sccm) and hydrogen at a flow rate of 300 sccm.

The type of nanotubes used in the present disclosure are not limited. The nanotubes may be entirely carbon, or they made be substituted, that it is, have non-carbon lattice atoms. Carbon nanotubes may be externally derivatized to include one or more functional moieties at a side and/or an end location. In some aspects, carbon and inorganic nanotubes include additional components such as metals or metalloids, incorporated into the structure of the nanotube. In certain aspects, the additional components are a dopant, a surface coating, or are a combination thereof.

Nanotubes may be metallic, semimetallic, or semi-conducting depending on their chirality. A carbon nanotube's chirality is indicated by the double index (n,m), where n and m are integers that describe the cut and wrapping of hexagonal graphite when formed into a tubular structure, as is well known in the art. A nanotube of an (m,n) configuration is insulating. A nanotube of an (n,n), or "arm-chair", configuration is metallic, and hence highly valued for its electric and thermal conductivity. Carbon nanotubes may have diameters ranging from about 0.6 nm for single-wall carbon nanotubes up to 500 nm or greater for single-wall or multi-wall nanotubes. The nanotubes may range in length from about 50 nm to about 10 cm or greater.

In a non-limiting example, the carbon nanotubes may be synthesized in a reactor or furnace from a carbon source in the presence of a catalyst, at a temperature of about 1000 to about 1500° C., such as about 1300° C.

The present disclosure is not limited to the type or form of catalysts used for the production of carbon nanotubes. In various aspects, the catalyst particles are present as an aerosol. In some aspects, the catalyst materials are supplied as nanoparticles, comprising a transition metal, a lanthanide metal, or an actinide metal. For example, the catalyst may comprise a Group VI transition metal such as chromium (Cr), molybdenum (Mo), and tungsten (W), or a Group VIII transition metal such as iron (Fe), cobalt (Co), nickel (Ni), ruthenium (Ru), rhodium (Rh), palladium (Pd), osmium (Os), Iridium (Ir), and platinum (Pt). In some aspects, a combination of two or more metals are used, for example an iron, nickel, and cobalt mixture or more specifically a 50:50 mixture (by weight) of nickel and cobalt. The catalyst may comprise a pure metal, a metal oxide, a metal carbide, a nitrate salt of a metal, and/or other compounds containing one or more of the metals described herein. The catalyst may be added to the reactor at about 0.1 atom % to about 10 atom %, where atom % indicates the percentage of the number of catalyst atoms with respect to the total number of atoms in the reactor (catalyst and carbon precursor atoms).

Alternatively or in combination, a catalyst precursor may be introduced, wherein the catalyst precursor can be converted to an active catalyst under the reactor's conditions. The catalyst precursor may comprise one or more transition metal salts such as a transition metal nitrate, a transition metal acetate, a transition metal citrate, a transition metal chloride, a transition metal fluoride, a transition metal bromide, a transition metal iodide, or hydrates thereof. For example, the catalyst precursor may be a metallocene, a metal acetylacetonate, a metal phthalocyanine, a metal porphyrin, a metal salt, a metalorganic compound, or a combination thereof. For example, the catalyst precursor may be a ferrocene, nickelocene, cobaltocene, molybdenocene, ruthenocene, iron acetylacetonate, nickel acetylacetonate, cobalt acetylacetonate, molybdenum acetylacetonate, ruthenium acetylacetonate, iron phthalocyanine, nickel phthalocyanine, cobalt phthalocyanine, iron porphyrin, nickel porphyrin, cobalt porphyrin, an iron salt, a nickel salt, cobalt salt, molybdenum salt, ruthenium salt, or a combination thereof. The catalyst precursor may comprise a soluble salt such as $Fe(NO_3)_3$, $Ni(NO_3)_2$ or $Co(NO_3)_2$ dissolved in a liquid such as water. The catalyst precursor may achieve an intermediate catalyst state in the catalyst particle growth zone of the reactor, and subsequently become converted to an active catalyst upon exposure to the nanostructure growth conditions in the nanostructure growth zone of the reactor. For example, the catalyst precursor may be a transition metal salt that is converted into a transition metal oxide in the catalyst particle growth zone, then converted into active catalytic nanoparticles in the nanostructure growth zone.

The catalyst particles may comprise a transition metal, such as a d-block transition metal, an f-block transition metal, or a combination thereof. For example, the catalyst particles may comprise a d-block transition metal such as an iron, nickel, cobalt, gold, silver, or a combination thereof. The catalyst particles may be supported on a catalyst support. In order to have catalyst particles on a catalyst support, the catalyst support material may be introduced into the catalyst material prior to adding the catalyst to the reactor.

The present disclosure is not limited to the type of carbon precursors or carbon sources used to form carbon nanotubes such as one or more carbon-containing gases, one or more hydrocarbon solvents, and mixtures thereof. Examples of carbon precursors include, but are not limited to hydrocarbon gases, such as methane, acetylene, and ethylene; alcohols, such as ethanol and methanol; benzene; toluene; CO; and $CO_2$. A fuel for carbon nanotube synthesis and growth comprises a mixture of one or more carbon precursors or carbon sources and one or more catalysts or catalyst precursors.

The fuel or precursor may be injected at a range of about 0.05 to about 1 ml/min, such as about 0.1 ml/min or about 0.3 ml/min, per injector. In some embodiments, more than one injector may be used, for example at large scale. The gas flow rate may be about 0.1 to about 5 L/min of hydrogen and/or about 0.2 to about 2 L/min helium or argon, such as about 5 L/min hydrogen, or 0.3 L/min hydrogen and about 1 L/min argon. Without wishing to be bound to any particular theory, helium or argon may be included in the carrier gas to dilute the hydrogen concentration, for example to keep the hydrogen concentration below the explosive limit. Selection of a fuel injection rate and/or a gas flow rate may depend, for example, on the reactor volume, as will be apparent to those of ordinary skill in the art. In some embodiments, more than one reactor may be used in conjunction. In some embodiments, the reactor temperature profile consists of a starting low temperature, an increase to a peak or a maximum, and then a decrease, preferably to the starting low temperature. Without wishing to be bound by any particular theory, for a given reactor temperature profile, the injector position inside the reactor should be correlated with the precursor temperature so that the precursor evaporates from the point of injection, without droplet formation or decomposition, as can be determined by those of ordinary skill in the art, considering for example the boiling point and decomposition. In some embodiments, the injector tip may be inserted into the reactor, for example, by about 8 inches. The injection temperature, at the tip of the injector, may depend on the reactor or furnace temperature and upon the depth of insertion of the injector into the reactor or furnace. In some embodiments, the injection temperature at the tip of the injector is about 750° C. In some embodiments, the injector tip is inserted about 8 inches inside the reactor. The carbon nanotube reactor may be run for any suitable length of time to obtain the product composition and thickness desired, as can be determined by those of ordinary skill in the art, for example as long as there are starting materials.

Figure 6:
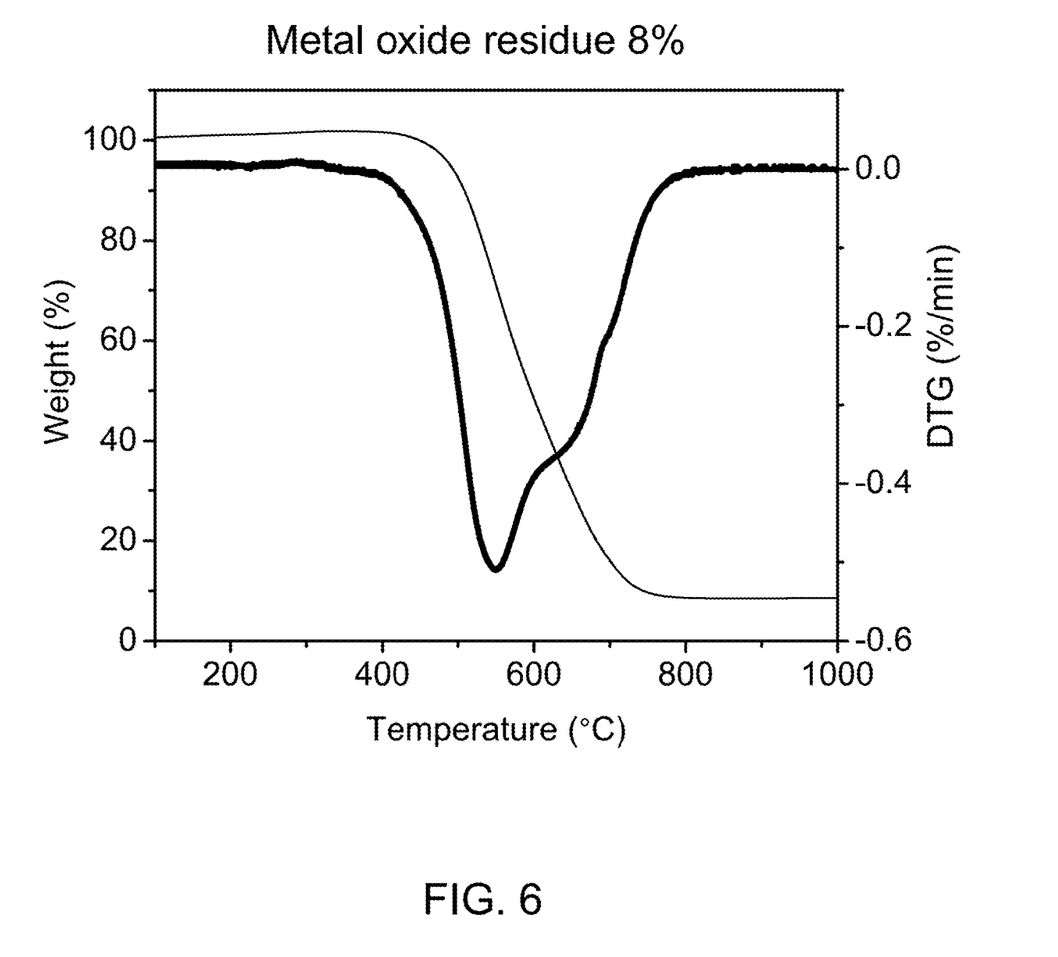
FIG. 6 shows derivative thermogravimetric analysis (DTG) of carbon nanotubes synthesized according to an embodiment of the present disclosure.

Carbon nanotubes synthesized according to the present disclosure may be characterized using any suitable means known in the art, including but not limited to derivative thermogravimetric analysis (DTG) and Raman spectroscopy, such as for calculation of the G/D ratio, as is disclosed in U.S. Patent Application Publication No. 2009/0274609, which is incorporated herein by reference in its entirety. The Raman spectra of SWNTs has three major peaks, which are the G-band at about 1590 cm$^{-1}$, D-band at about 1350 cm$^{-1}$, and the Radial breathing mode (RBM) at about 100-300 cm$^{-1}$. RBM frequency is proportional to an inverse of the diameter of SWNTs and can thus be used to calculate the diameter of the SWNT. Normally, a red shift in RBM peak corresponds to an increase in the mean diameter of SWNTs. The tangential mode G-band related to the Raman-allowed phonon mode $E_{2g}$ can be a superposition of two peaks. The double peak at about 1593 and 1568 cm$^{-1}$ has been assigned to semiconductor SWNTs, while the broad Breit-Wigner-Fano line at about 1550 cm$^{-1}$ has been assigned to metallic SWNTs. Thus, G-band offers a method for distinguishing between metallic and semiconducting SWNTs. The D-band structure is related to disordered carbon, the presence of amorphous carbon, and other defects due to the sp$^2$-carbon network. The ratio of the G-band to D-band in the Raman spectra ($I_G$:$I_D$ or G/D ratio) of SWNTs can be used as an index to determine the purity and quality of the SWNTs produced. Preferably, $I_G$:$I_D$ is about 1 to about 500, preferably about 5 to about 400, more preferably greater than about 7. A representative, non-limiting example of DTG of carbon nanotubes synthesized according to the present disclosure is shown in FIG. 6.

Collecting the mixture of single-walled carbon nanotubes and aerosolized electrode active material powder on a surface and removing the carrier gas may be carried out by any suitable means. The collecting surface of the porous substrate 40, 41 may be a porous surface, including but not limited to a filter or a frit, where the pores are appropriately sized to retain the mixture of carbon nanotubes and the electrode active material thereon to form the self-standing electrode while permitting passage of the carrier and fluidizing gases. The carrier and fluidizing gases may be removed after passing through the surface and by way of an outlet. In some embodiments, removal of the carrier gas may be facilitated by a vacuum source. With respect to filters, the filters may be in the form of a sheet and may comprise a variety of different materials including woven and non-woven fabrics. Illustrative filter materials include, but are not limited to, cotton, polyolefins, nylons, acrylics, polyesters, fiberglass, and polytetrafluoroethylene (PTFE). To the extent the porous substrate is sensitive to high temperatures, one or more of the streams 25A, 25B, and 30 may be precooled with dilution gases comprising a lower temperature and/or by directing one or more of the streams 25A, 25B and 30 through a heat exchanger prior to contacting the porous substrate.

In some embodiments, the aerosolizing of the electrode active material comprises distributing an aerosolizing gas through a first porous frit and a bed of an electrode active material, in an aerosolizing chamber, to produce the aerosolized electrode active material powder. The aerosolizing chamber may be constructed with an appropriately sized porous material such that gas can pass through to enable aerosolization but that does not permit the active material to fall through the pores. The aerosolizing chamber is not limited to any particular configuration. Suitable aerosolizing gases include, but are not limited to, argon, helium, or nitrogen. In some embodiments, the aerosolizing gas may be the same as the carrier gas.

In some embodiments, the electrode active material is selected from graphite, hard carbon, metal oxides, lithium metal oxides, and lithium iron phosphate. In some embodiments, the electrode active material for the anode may be graphite or hard carbon. In some embodiments, the electrode active material for the cathode may be lithium metal oxides or lithium iron phosphate.

In a non-limiting example, the electrode active material may be any solid, metal oxide powder that is capable of being aerosolized. In an illustrative example, the metal oxide is a material for use in the cathode of the battery. Non-limiting examples of metal oxides include oxides of Ni, Mn, Co, Al, Mg, Ti and any mixture thereof. The metal oxide may be lithiated. In an illustrative example, the metal oxide is lithium nickel manganese cobalt oxide ($LiNiMnCoO_2$). The metal oxide powders can have a particle size defined within a range between about 1 nanometer and about 100 microns. In a non-limiting example, the metal oxide particles have an average particle size of about 1 nanometer to about 10 nanometers.

Metals in lithium metal oxides according to the present disclosure may include but are not limited to one or more alkali metals, alkaline earth metals, transition metals, aluminum, or post-transition metals, and hydrates thereof. In some embodiments, the electrode active material is lithium nickel manganese cobalt oxide ($LiNiMnCoO_2$).

"Alkali metals" are metals in Group I of the periodic table of the elements, such as lithium, sodium, potassium, rubidium, cesium, or francium.

"Alkaline earth metals" are metals in Group II of the periodic table of the elements, such as beryllium, magnesium, calcium, strontium, barium, or radium.

"Transition metals" are metals in the d-block of the periodic table of the elements, including the lanthanide and actinide series. Transition metals include, but are not limited to, scandium, titanium, vanadium, chromium, manganese, iron, cobalt, nickel, copper, zinc, yttrium, zirconium, niobium, molybdenum, technetium, ruthenium, rhodium, palladium, silver, cadmium, lanthanum, cerium, praseodymium, neodymium, promethium, samarium, europium, gadolinium, terbium, dysprosium, holmium, erbium, thulium, ytterbium, lutetium, hafnium, tantalum, tungsten, rhenium, osmium, iridium, platinum, gold, mercury, actinium, thorium, protactinium, uranium, neptunium, plutonium, americium, curium, berkelium, californium, einsteinium, fermium, mendelevium, nobelium, and lawrencium.

"Post-transition metals" include, but are not limited to, gallium, indium, tin, thallium, lead, bismuth, or polonium.

In some embodiments, the method further comprises allowing the mixture of single-walled carbon nanotubes and electrode active material in the carrier gas to flow through one or more tubes connecting the aerosolizing reactor, the carbon nanotube synthesis reactor, and the collection chamber. In some embodiments, the one or more tubes are at least about 0.5" O.D. stainless tubing.

The loading or weight % of carbon nanotubes in the composite self-standing electrode product is based on the relative amounts of the nanotubes (or carbon source used to form the nanotubes) and the electrode active material. It is within the level of ordinary skill in the art to determine the relative starting amounts of carbon source, catalyst/catalyst precursor, and electrode active material that will afford a given loading or weight % of carbon nanotubes in the composite self-standing electrode product. In a non-limiting example, the self-standing electrode may comprise from 0.1% to 4% by weight carbon nanotubes, and the balance the electrode active material and optionally one or more additives. Optionally, the self-standing electrode may comprise from 0.2% to 3% by weight carbon nanotubes, and the balance the electrode active material and optionally one or more additives. Optionally, the self-standing electrode may comprise from 0.75% to 2% by weight carbon nanotubes, and the balance the electrode active material and optionally one or more additives. Additives and/or dopants may be present for each range in an amount of 0 to 5% by weight. In a non-limiting example, the self-standing electrode consists essentially of the carbon nanotubes and the electrode active material powder. In a non-limiting example, the self-standing electrode consists of the carbon nanotubes and the electrode active material powder. For each of the ranges, the self-standing electrode may be free of any binders. The lack of a binder results in a self-standing electrode with improved flexibility. Further, it has been discovered that a higher carbon nanotube content increases the flexibility of the self-standing electrode. Without being bound to any particular theory, this is likely due to the webbed morphology of the self-standing electrode in which there is a webbed arrangement of carbon nanotubes with the electrode active material contained or embedded within the web.

In a non-limiting example, the self-standing electrode may comprise a density of 0.9 to 1.75 g/cc. Optionally, the self-standing electrode may comprise a density of 0.95 to 1.25 g/cc. Optionally, the self-standing electrode may comprise a density of 0.75 to 2.0 g/cc. Optionally, the self-standing electrode may comprise a density of 0.95 to 1.60 g/cc.

In a non-limiting example, the self-standing electrode may comprise a thickness of up to 750 μm following collection on the porous substrate. Optionally, the self-standing electrode may comprise a thickness of 50 μm to 500 μm following collection on the porous substrate. Optionally, the self-standing electrode may comprise a thickness of from 100 μm to 450 μm following collection on the porous substrate. Optionally, the self-standing electrode may comprise a thickness of from 175 μm to 250 μm following collection on the porous substrate.

In some embodiments, the method of the present disclosure may further comprise treating the composite or self-standing electrode, including but not limited to pressing the composite or self-standing electrode. Without wishing to be bound to any particular theory, pressing may increase the density and/or lower the thickness of the self-standing electrode, which may improve such properties as rate performance, energy density, and battery life. Pressing of the self-standing electrodes may be carried out by applying a force to achieve a desired thickness and/or density, such as by using a rolling press or calendaring machine, platen press, or other suitable means, as will be known to those of ordinary skill in the art. Any suitable force may be applied, to achieve a desired thickness, and/or density, and/or impedance, such as but not limited to a force of about 1 ton, about 2 tons, about 3 tons, about 4 tons, about 5 tons, about 6 tons, about 7 tons, about 8 tons, about 9 tons, about 10 tons, about 15 tons, or any integer or range in between, such as between about 7 tons and about 10 tons. In some embodiments, pressing may be limited to pressing to a thickness of about 20 microns, about 30 microns, about 40 microns, about 50 microns, about 60 microns, about 70 microns, about 80 microns, about 90 microns, about 100 microns, about 150 microns, about 200 microns, about 250 microns, about 300 microns, about 350 microns, about 400 microns, or any integer or range in between. Without wishing to be bound by any particular theory, too thick of an electrode may be slow to produce energy or may not be suitably flexible. In some embodiments, it may be desirable to obtain an electrode foil that is flexible without formation of oxide or cracks. If the electrode is too thin, energy production may be rapid but it may be the case that not enough energy is produced. In addition, it may be desirable to regulate the distance between the rolls or rollers in a rolling press or calendaring machine, or between the plates of a platen press, by any suitable means known to those of ordinary skill in the art.

Determination of a suitable amount of pressing is within the level of ordinary skill in the art. As will be known to those of ordinary skill in the art, excessive pressing may cause the electrolyte to penetrate the electrode too much, as determined by measuring impedance and/or resistance to diffusion. As will be evident to those of ordinary skill in the art, it may be of interest to minimize the electrolyte diffusion resistance or coefficient for a given electrolyte, as measured by impedance. In a non-limiting example, the thickness of the self-standing electrode following pressing may be from 40% to 75% of the thickness of the untreated self-standing electrode, or the self-standing electrode following collection on the porous substrate. Optionally, the thickness of the self-standing electrode following pressing may be from 45% to 60% of the thickness of the untreated self-standing electrode, or the self-standing electrode following collection on the porous substrate.

In a non-limiting example, the density of the self-standing electrode following pressing is increased by 40% to 125% of the density of the untreated self-standing electrode, or the self-standing electrode following collection on the porous substrate. Optionally, the density of the self-standing electrode following pressing is increased by 45% to 90% of the density of the untreated self-standing electrode, or the self-standing electrode following collection on the porous substrate.

In some embodiments, the present disclosure is directed to an apparatus for producing a self-standing electrode, comprising: a single-walled carbon nanotube synthesis reactor which produces single-walled carbon nanotubes; an aerosolizing reactor configured to aerosolize an electrode active material into an aerosolized electrode active material powder and connected to the carbon nanotube synthesis reactor such that the aerosolized electrode active material powder is contacted with the single-walled carbon nanotubes in a carrier gas to form a mixture of the single-walled carbon nanotubes and the aerosolized electrode active material powder; and a collection chamber having a surface configured to collect the mixture and remove the carrier gas so as to form the self-standing electrode material that is a composite of the single-walled carbon nanotubes and the electrode active material. All embodiments described for the method apply with equal force to the apparatus.

The surface may be configured to collect the mixture and remove the carrier gas by any suitable means. The collecting surface may be a porous surface, including but not limited to a filter or a frit, where the pores are appropriately sized to permit passage of the carrier gas but not the mixture of carbon nanotubes and electrode active material. The carrier gas may be removed after passing through the surface and by way of an outlet. In some embodiments, removal of the carrier gas may be facilitated by a vacuum source.

In some embodiments, the aerosolizing reactor comprises a vertical shaker, one or more gas inlets, one or more outlets, and a first porous frit.

In some embodiments, the aerosolizing reactor is downstream of the carbon nanotube synthesis reactor and upstream of the collection chamber.

In some embodiments, the aerosolizing reactor is upstream of the carbon nanotube synthesis reactor and upstream of the collection chamber.

In some embodiments, the aerosolizing reactor is coincident with the carbon nanotube synthesis reactor and upstream of the collection chamber.

In some embodiments, the present disclosure is directed to a self-standing electrode, comprising a composite of an electrode active material and single-walled carbon nanotubes; wherein the self-standing electrode does not contain binder material or a metal-based current collector material.

In some embodiments, the self-standing electrode comprises a webbed morphology or a net. In some embodiments, a webbed morphology or a net is a webbed arrangement of carbon nanotubes with the electrode active material contained or embedded within the carbon nanotube web or net.

While the aspects described herein have been described in conjunction with the example aspects outlined above, various alternatives, modifications, variations, improvements, and/or substantial equivalents, whether known or that are or may be presently unforeseen, may become apparent to those having at least ordinary skill in the art. Accordingly, the example aspects, as set forth above, are intended to be illustrative, not limiting. Various changes may be made without departing from the spirit and scope of the disclosure. Therefore, the disclosure is intended to embrace all known or later-developed alternatives, modifications, variations, improvements, and/or substantial equivalents.

Thus, the claims are not intended to be limited to the aspects shown herein, but are to be accorded the full scope consistent with the language of the claims, wherein reference to an element in the singular is not intended to mean "one and only one" unless specifically so stated, but rather "one or more." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

Further, the word "example" is used herein to mean "serving as an example, instance, or illustration." Any aspect described herein as "example" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. Nothing disclosed herein is intended to be dedicated to the public regardless of whether such disclosure is explicitly recited in the claims.

Moreover, all references throughout this application, for example patent documents including issued or granted patents or equivalents; patent application publications; and non-patent literature documents or other source material; are hereby incorporated by reference herein in their entireties, as though individually incorporated by reference.

The following examples are put forth so as to provide those of ordinary skill in the art with a complete disclosure and description of how to make and use the present invention, and are not intended to limit the scope of what the inventors regard as their invention nor are they intended to represent that the experiments below are all or the only experiments performed. Efforts have been made to ensure accuracy with respect to numbers used (e.g. amounts, dimensions, etc.) but some experimental errors and deviations should be accounted for.

EXAMPLES

Production of flexible self-standing electrodes. The following self-standing electrode examples set forth in FIGS. 7, 8, 9, 10, and Table 1 below were prepared in accordance with the present disclosure and are intended to illustrate the present disclosure without, however, limiting it.

Figure 5:
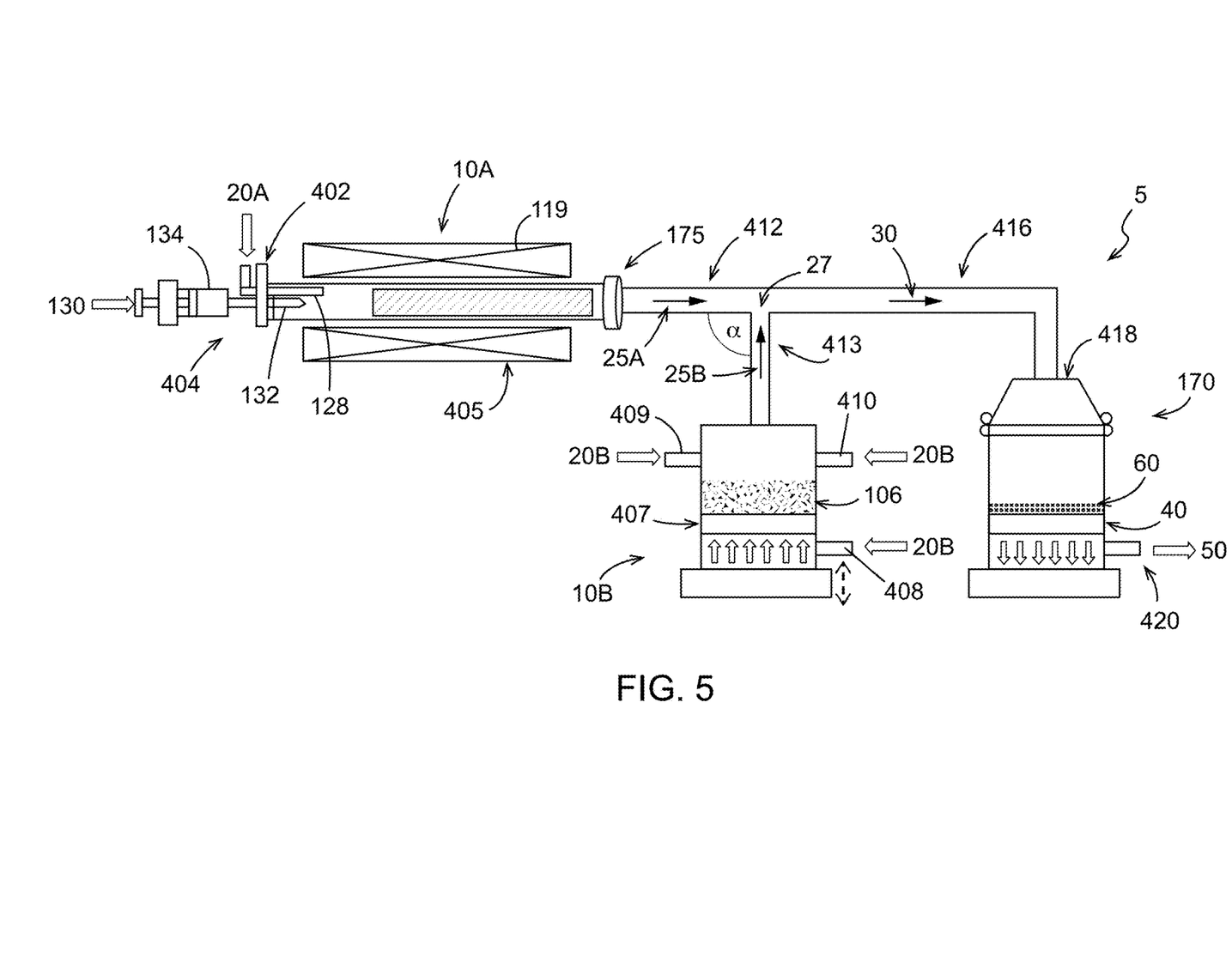
FIG. 5 is a schematic view of an apparatus according to an embodiment of the present disclosure.

A quartz tube having dimensions of 25 mm OD×22 mm ID×760 mm length was provided as the carbon nanotube reactor 10A for the apparatus 5 (FIG. 5). The reactor 10A was aligned horizontally with a left end closed with a barrier 402. However, the reactor 10A could be aligned vertically or at any angle therebetween. At the center of barrier 402, a carrier gas inlet 128 was provided for the carrier gas 20A and a catalyst/catalyst precursor inlet 132 was provided for the catalyst/catalyst precursor 130. Both inlets 128 and 132 were positioned to the left of the section of the reactor 10A heated by the heat source 119.

Reactor 10A was heated to a temperature of 1300° C. The carrier gas 20A included a mixture of 850 sccm Ar and 300 sccm $H_2$ and was provided to the reactor 10A via inlet 128. The catalyst precursor 130 composition was 80% ethanol, 20% methanol, 0.18% ferrocene, and 0.375% thiophene. The ethanol functioned both as a solvent for the ferrocene and as the carbon source for growing the nanotubes. The catalyst precursor 130 solution was injected at a rate of 0.3 ml/min via inlet 132 into the reactor carbon nanotube growth zone, where the ferrocene decomposed to iron catalyst particles and the ethanol was converted to a carbon source for the growth of single-walled nanotubes on the iron catalysts. The carrier gas 20A transported the single-walled nanotubes through reactor outlet 175 and into tube 412 as the first aerosolized stream 25A.

Lithium nickel manganese cobalt oxide ($LiNiMnCoO_2$) particles were used as the electrode active material 106 and were loaded into aerosolizing chamber 10B on frit 407 to a height of about 5 mm, loading about 50 g. The carrier/aerosolizing gas 20B, argon, was provided at a rate of about 2 L/min Ar through porous fit 407 via inlet 408 (1 L/min; bottom up) and inlets 409, 410 (1 L/min; tangential flows) in combination. Aerosolized suspended $LiNiMnCoO_2$ exits aerosolizing chamber 10B as the second aerosolized stream 25B via tube 413 and combines with the first aerosolized stream 25A comprising the synthesized carbon nanotubes traveling through tube 412 at the junction 27, forming a mixture 30 of aerosolized, suspended $LiNiMnCoO_2$ and carbon nanotubes in the carrier gases. The mixture 30 travels through tube 416 into collection chamber 170 via an inlet 418. The mixture 30 of $LiNiMnCoO_2$ and carbon nanotubes deposits on the porous substrate 40, in this case a porous frit, as a composite self-standing electrode 60, as the carrier gases 50 pass through frit 40 and out an exhaust 420.

Figure 7:
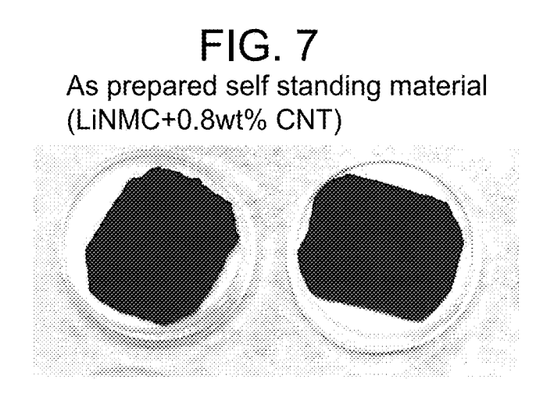
FIG. 7 shows self-standing electrodes as collected from a porous surface.
Figure 8:
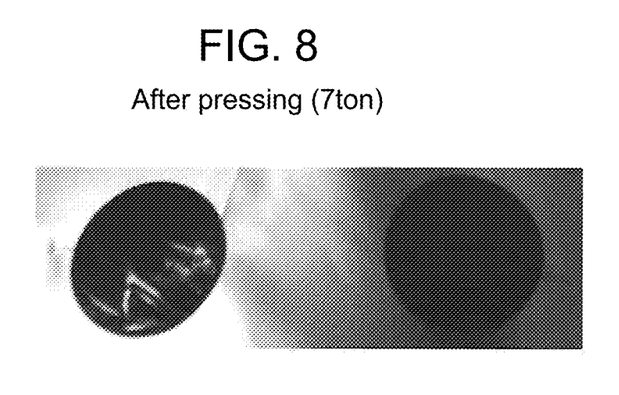
FIG. 8 shows self-standing electrodes after treating to increase the density.
Figure 9:
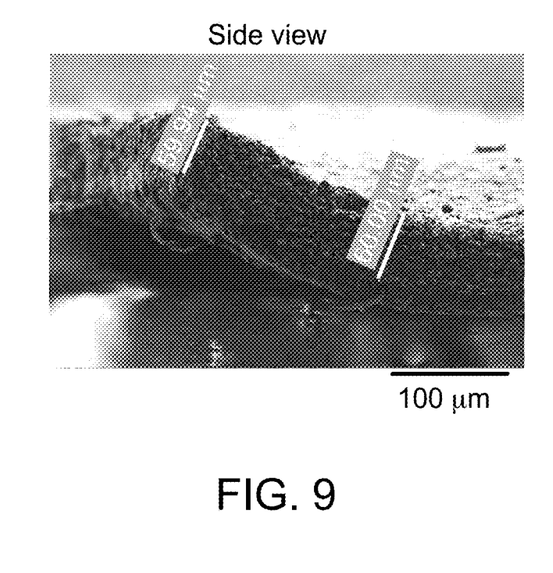
FIG. 9 is a magnified side view of a treated self-standing electrode.
Figure 10:
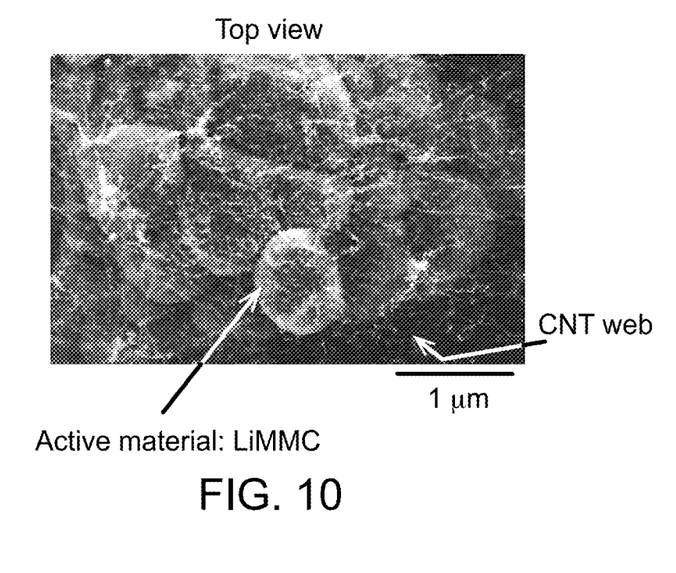
FIG. 10 is a magnified overhead view of the treated self-standing electrode.

As shown in FIG. 7, two composite self-standing electrodes 60 were collected from the porous substrate that included about 0.8 weight % single-walled carbon nanotubes and the balance $LiNiMnCoO_2$ particles. The self-standing electrode 60 was then treated to increase the density by pressing (7 ton), to afford the treated self-standing electrode in FIG. 8. As shown in the magnified view of FIG. 9, the treated self-standing electrode 60 comprises a thickness of about 60 pun. In addition, it is noted that the self-standing electrode 60 shown in FIG. 9 (after pressing) is flexible and bent upwardly at the illustrated corner. This is likely due to the web-like or non-woven fiber sheet formed by the carbon nanotubes as shown in FIG. 10 (after pressing). The carbon nanotube web surrounds the $LiNiMnCoO_2$ particles to retain the $LiNiMnCoO_2$ particles therein without the need for a binder in a flexible manner that allows for bending of the self-standing electrode.

As shown below in Table 1, several additional self-standing electrodes were prepared using the same method with differing amounts of single-walled nanotubes (the balance of the self-standing electrode being LiNiMnCoO2 particles), as well as different thicknesses (as collected from the porous substrate). The self-standing electrodes of samples 7-11 were treated following collection from the porous substrate by pressing to increase the density. Pressing of the self-standing electrodes also resulted in a thickness reduction.

TABLE 1

| Sample No. | Weight (mg) | Self-standing Electrode Composition as Collected from Porous Substrate: Single-walled nanotube loading (weight %) | Original thickness of Self-Standing Electrode as Collected from Porous Substrate (μm) | Original density of Self-Standing Electrode as Collected from Porous Substrate (g/cc) | Thickness of Self-Standing Electrode after Pressing (mm) | Density of Self-Standing Electrode after Pressing (g/cc) |
|---|---|---|---|---|---|---|
| 1 | 417 | 1.2 | 125 | 1.20 | unknown | unknown |
| 2 | 612 | 1.1 | 200 | 1.11 | unknown | unknown |
| 3 | 572 | 1.1 | 200 | 1.03 | unknown | unknown |
| 4 | 318 | 1.9 | unknown | unknown | unknown | unknown |
| 5 | 138 | 1.5 | unknown | unknown | unknown | unknown |
| 6 | 151 | 1.6 | unknown | unknown | unknown | unknown |
| 7 | 293 | 0.46 | 196 | 1.25 | 112 | 2.14 |
| 8 | 265 | 0.73 | 211 | 1.05 | 148 | 1.49 |
| 9 | 339 | 0.41 | 244 | 1.16 | 128 | 2.20 |
| 10 | 811 | 0.21 | 434 | 1.56 | 220 | 2.28 |
| 11 | 266 | 0.63 | 231 | 0.96 | 109 | 2.03 |

What is claimed is:

1. A method of producing a self-standing electrode, the method comprising:
   aerosolizing an electrode active material to produce an aerosolized electrode active material powder;
   contacting the aerosolized electrode active material powder with single-walled carbon nanotubes in a carrier gas to form a mixture of the single-walled carbon nanotubes and the aerosolized electrode active material powder;
   collecting the mixture on a porous surface, wherein at least a portion of the carrier gas passes through the porous surface; and
   removing the mixture from the porous surface, to form the self-standing electrode material that is a composite of the single-walled carbon nanotubes and the electrode active material, wherein the self-standing electrode is free of binder and metal-based current collector, and wherein the self-standing electrode comprises 0.1% to 4% by weight carbon nanotubes and has a density of 0.75 g/cc to 2.28 g/cc.

2. The method of claim 1, wherein the aerosolizing of the electrode active material comprises distributing an aerosolizing gas through a first porous frit and a bed of an electrode active material, in an aerosolizing reactor, to produce the aerosolized electrode active material powder.

3. The method of claim 1, further comprising providing the single-walled carbon nanotubes from a carbon nanotube synthesis reactor.

4. The method of claim 1, wherein the porous surface is comprised by a porous frit in a collection chamber.

5. The method of claim 1, wherein the electrode active material is selected from graphite, hard carbon, lithium metal oxides, and lithium iron phosphate.

6. The method of claim 1, further comprising synthesizing the single-walled carbon nanotubes in a carbon nanotube synthesis reactor.

7. The method of claim 6, wherein the contacting of the aerosolized electrode active material powder with the single-walled carbon nanotubes occurs downstream of the carbon nanotube synthesis reactor and upstream of the porous surface.

8. A method of producing a self-standing electrode, the method comprising:
   providing an aerosolized mixture of carbon nanotubes and an electrode active material powder;
   providing at least a first porous substrate;
   directing the aerosolized mixture toward the first porous substrate;
   collecting the mixture on the first porous substrate; and
   removing the mixture from the first porous substrate to form the self-standing electrode, wherein the self-standing electrode is free of binder and metal-based current collector, and wherein the self-standing electrode comprises 0.1% to 4% by weight carbon nanotubes and has a density of 0.75 g/cc to 2.28 g/cc.

9. The method of claim 8 wherein the aerosolized mixture comprises at least one carrier gas that passes through the porous substrate as the mixture is collected on the porous substrate.

10. The method of claim 9 wherein the mixture is collected on the porous substrate until the collected mixture comprises a thickness of up to 750 µm.

11. The method of claim 10 wherein the mixture is collected on the porous substrate until the collected mixture comprises a thickness of 100 µm to 450 µm.

12. The method of claim 10 wherein the self-standing electrode has a density of 0.75 g/cc to 2.0 g/cc.

13. The method of claim 12 wherein the self-standing electrode has a density of 0.95 g/cc to 1.60 g/cc.

14. The method of claim 8 further comprising treating the self-standing electrode to increase the density of the self-standing electrode, wherein the treated self-standing electrode has a density that is 40% to 125% greater than the density of the untreated self-standing electrode.

15. The method of claim 14 wherein the treated self-standing electrode has a density that is 45% to 90% greater than the density of the untreated self-standing electrode.

16. The method of claim 14 wherein the treated self-standing electrode has a thickness that is 40% to 75% of the thickness of the untreated self-standing electrode.

17. The method of claim 8 wherein the step of providing an aerosolized mixture of carbon nanotubes and an electrode active material powder comprises:
   providing a first aerosolized stream comprising the carbon nanotubes and at least one carrier gas;
   providing a second aerosolized stream comprising the electrode active material powder and at least one carrier gas; and
   mixing the first aerosolized stream and the second aerosolized stream to provide the aerosolized mixture.

18. The method of claim 17 wherein the first aerosolized stream comprises a product stream exiting from a nanotube synthesis reactor.

19. The method of claim 18 further comprising:
   providing a carbon source in the nanotube synthesis reactor;
   growing carbon nanotubes in the presence of a carrier gas;
   transferring the product stream comprising the carbon nanotubes and the carrier gas out of the nanotube synthesis reactor as the first aerosolized stream.

20. The method of claim 8 further comprising:
   redirecting the mixture toward a second porous substrate after the collected mixture formed on the first porous substrate comprises a first desired thickness; and
   collecting the mixture on the second porous substrate until a second collected mixture comprises a second desired thickness.

21. The method of claim 20 wherein the step of redirecting the mixture further comprises:
   measuring a pressure drop across a first porous surface of the first porous substrate; and
   redirecting the mixture toward the second porous substrate after a pressure drop associated with the first desired thickness is measured across the first porous surface.

22. The method of claim 8 wherein the self-standing electrode comprises 0.2% to 3% by weight carbon nanotubes.

23. The method of claim 22 wherein the self-standing electrode comprises 0.75% to 2% by weight carbon nanotubes.

24. The method of claim 8 wherein the self-standing electrode consists essentially of the carbon nanotubes and the electrode active material powder.

25. The method of claim 8 wherein the self-standing electrode consists of the carbon nanotubes and the electrode active material powder.

26. The method of claim 8 wherein the nanotubes comprises single-walled carbon nanotubes.

27. The method of claim 26 wherein the electrode active material powder comprises graphite.

28. The method of claim 26 wherein the electrode active material powder comprises a metal oxide.

29. The method of claim 28 wherein the electrode active material powder comprises $LiNiMnCoO_2$.

30. The method of claim 26 wherein the self-standing electrode comprises a webbed arrangement of the carbon nanotubes with the electrode active material embedded within the carbon nanotube web.

31. The method of claim 30 wherein the self-standing electrode is flexible.

* * * * *